United States Patent [19]

Agut Sanz

[11] Patent Number: 5,205,760
[45] Date of Patent: Apr. 27, 1993

[54] ADAPTER FOR ELECTRIC PUSHBUTTONS AND THE LIKE

[75] Inventor: Juan Agut Sanz, Terrassa, Spain
[73] Assignee: Agut, S.A., Terrassa, Spain
[21] Appl. No.: 724,428
[22] Filed: Jul. 3, 1991

[30] Foreign Application Priority Data

Jul. 4, 1990 [ES] Spain .................................. 9002129
Jul. 4, 1990 [ES] Spain .................................. 9002130

[51] Int. Cl.⁵ .......................................... H01R 13/74
[52] U.S. Cl. .................................. 439/551; 248/27.1
[58] Field of Search ............... 439/548, 550, 551, 556; 248/27.1

[56] References Cited

U.S. PATENT DOCUMENTS 4,174,873 11/1979 Hargett et al. .................. 439/551 X
4,421,369 12/1983 Myking ............................ 439/551 X Primary Examiner—Eugene F. Desmond

[57] ABSTRACT

It can be coupled to a control panel (1) in order to permit the fastening of a pushbutton or the like in a hole with a larger diameter than that of the pushbutton which comprises a cylindric body (2) with a rear extension (3) with a smaller diameter, threaded to receive a fastening nut (4.) It consists of a ring (5) provided inside with a front shoulder (6) similar to the rear shoulder (7) provided between the cylindric body (2) and the rear extension (3) of the pushbutton. The back of the ring (5) includes a tubular portion (10) that fits adjustably between the rear extension (3) of the pushbutton and the hole (11) of the control panel (1.)

In another embodiment the cylindric body (2) is adapted to the control panel (1) by means of a base made up of a prismatic body (20), with a circular opening of the same diameter as the body (2) of the pushbutton. The bottom of the circular opening (21) includes an annular flange (22) with an inside diameter that coincides with the rear extension (3) of the pushbutton, said annular flange (22) constituting a positioning seat of the prismatic body (20) with regard to the cylindric body (2) of the pushbutton allowing the coupling to the control panel (1) by means of the fastening nut (4) conventionally threaded to the rear extension (3.)

9 Claims, 3 Drawing Sheets

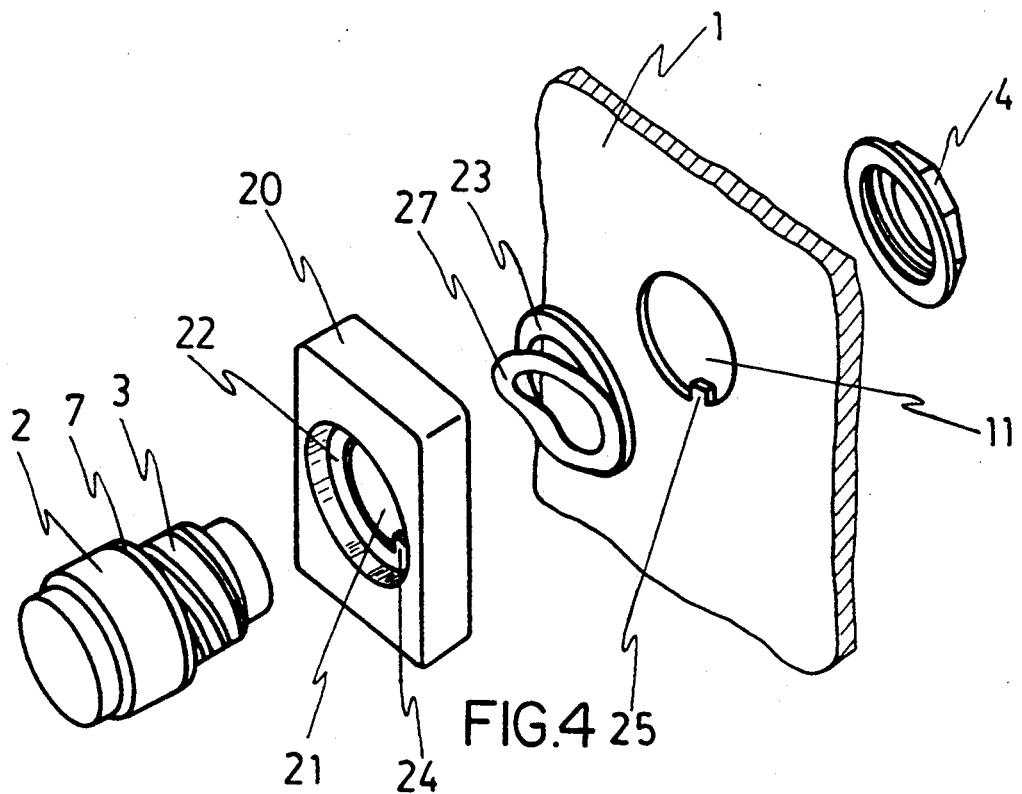
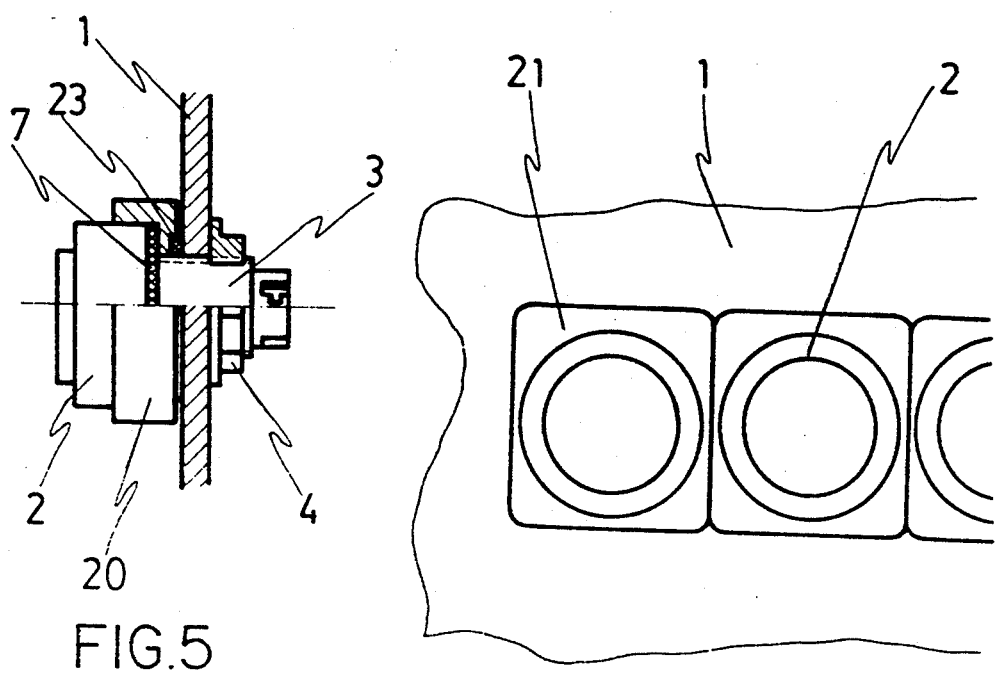

000# ADAPTER FOR ELECTRIC PUSHBUTTONS AND THE LIKE

OBJECT OF THE INVENTION

As is expressed in the title of this specification, the present invention refers to an improved adapter for electric pushbuttons and the like, which has been conceived and made in order to permit the assembly of pushbuttons, pilots, indicators or analogous components, in holes made for this purpose in a control panel, such as the one of the panels of electric installations, in such a way that by means of the adapter itself it is possible to assemble the element of the cited ones with a diameter smaller than the one provided in the other elements that are assembled and fastened directly in the holes made in said control panel, in such a way that the adapter enables the interchangeability of components (pilots, pushbuttons, etc.) of different formats, thus allowing the unification of the construction of control panels, upon allowing pushbuttons with a diameter smaller than that of the hole provided for the location of the same to be included.

Another object of the invention consists of allowing the assembly of said pushbuttons, pilots, indicators or analogous components in holes of the suitable diameter for said components, provided in control panels, by means of a circular or quadrangular base piece avoiding the use of auxiliary pieces.

BACKGROUND OF THE INVENTION

The regulations in force that regulate that assembly of electric control boards establish a minimum distance of 30 mm. between the consecutive pushbuttons or indicators of a specific format and which are horizontally lined up in a battery.

On the other hand, the front surface of the component, above all in the case of pushbuttons, must be as large as possible to allow localization and operation thereof.

Now, then, generally pushbuttons and similar components are manufactured with a cylindric shape, although the base of the seat may be circular or even quadrangular. In both cases, it is conventional that the frame of the pushbutton is obtained in a single body in which the base is formed, be the base circular or quadrangular, and besides the side casing of the pushbutton itself, thus different pieces and molds are used in each model.

Such a circumstance makes the manufacturing of the unit more expensive and increases the amount and variety of pieces which are all negative factors.

In order to reduce these costs and to eliminate the above cited inconveniences and problems, there are presently solutions which consist of coupling between the body of the pushbutton and the ring that surrounds it an auxiliary piece whose outer contour is square. This solution, although it permits the converting of a circular based pushbutton into a square based one, still has the inconvenience that in order to place the square base in place, it is necessary to dismount the ring that surrounds the pushbutton. The ring axially retains the square base, which results in an increase of assembly costs. Thus, given the scarce dimensional margin that remains between two consecutive pushbuttons, some open sides have been established. These open sides are taken advantage of by inserting some auxiliary pieces that connect the bases, but this makes it necessary to assemble some terminal covers at the ends of each set of pushbuttons. This implies even more assembly, and thus, this solution is not the most satisfactory and desirable one.

Besides, conventionally there are basically two sizes of pushbuttons and similar components that make up both manufacturing series, thus, each one of these series offers some specific services and uses.

However, on many occasions, where the required features are complied with by these two series, for any reason it may be convenient to exchange or combine the components of both series.

Now then, in said cases or circumstances, the holes already made in control panels could be enlarged, but never reduced, thus it is not feasible to substitute a component of a larger series by one of the smaller series.

Consequently, there is no unification with regard to the diameter of the holes made in these control panels corresponding to electric installations or the like, not allowing the indistinct assembly of components of one format or another, in terms of the particular case and needs of the installation.

DESCRIPTION OF THE INVENTION

In order to solve each and every one of the inconveniences cited above, the adapter of the invention in the first embodiment makes it possible to exchange the components of different formats which are assembled in control panels of electric installations and the like, in such a way that by means of said adapter it is possible to assemble in the housing of the larger series, components belonging to the smaller series or format.

Besides, in a second embodiment the assembly is carried out by means of a circular or quadrangular base piece, that has a shape such that its assembly does not require any additional operations, nor are auxiliary pieces needed to obtain an adequate finish.

Thus, in the first embodiment, basically, the adapter constitutes a hollow body like a ring, which has inside a shoulder determining two sections of different diameter, in one of which there is positioned a section with a larger diameter belonging to the pushbutton or element that is to be mounted, while in the other section of a smaller diameter the section or axial extension of the pushbutton or element remains positioned. This second section also has the corresponding thread for fastening by means of a nut that remains situated at the opposite part of the panel where the pushbutton or element is to be mounted for which purpose in said panel there is a hole through which the second threaded section of a smaller diameter than the pushbutton or element passes, collaborating in the fastening a washer which in its inner contour has a projection which is lodged in a groove or peripheral notch of the threaded section of the pushbutton, thus permitting the correct positioning thereof in its assembly.

The ring that constitutes the adapter itself, aside from the section of different diameter cited above, has an extension or tubular portion that remains between the threaded section with a smaller diameter of the pushbutton and the inner contour of the hole corresponding to the control panel, and whose tubular portion has some notches for positioning the corresponding tray, as well as a projection precisely facing the one of the washer.

In this way by means of the adapter it is possible to assemble a pushbutton or element in a hole whose diameter corresponds to the one of the pushbutton or element whose format corresponds to a larger sized one. For this purpose it suffices to put the cited adapter in the corresponding hole, in which the pushbutton or element of a smaller format can be assembled and likewise fastened by means of a nut and washer later on.

In the second embodiment, the base piece is a body which is extremely simple to obtain and which has an extremely simple structure, having a very thin prismatic-rectangular shape, there being a circular central hole whose diameter coincides with that of the body of the pushbutton, with the particular feature that the inner contour of said hole of the body constituting the base, includes an annular inner flange whose inside diameter coincides with that of the rear extension of the body itself of the pushbutton, an extenson which has the corresponding thread, for a nut that tightens and fastens provided in the surface opposite the assembly panel, just like in the previous case, said panel obviously having the hole for the passing of the threaded section of the pushbutton whereby the fastening is finished by said nut.

In this second embodiment, it has also been provided that over the back of the inner flange provided in the hole of the body of the base, there is a washer that remains inserted between the flange and the surface corresponding to the control panel where the pushbutton is precisely assembled.

In this way, the assembly of said pushbutton by means of the base or body that constitutes it, does not require any additional elements or supplementary operations, as in the case of the conventional means presently used.

In order to complement the description that is going to be made hereinafter and in order to provide a better understanding of the features of the invention, this specification is accompanied by a series of drawings in whose figures one will more easily understand the innovations and advantages of the adapter and of the base piece for electric pushbuttons and the like object of the invention.

BRIEF DESCRIPTION OF THE DRAWINGS

FIG. 4—It shows a perspective view, broken up, of the different elements, including the base piece, to allow the assembly of a pushbutton upon the hole provided for that purpose in a control panel, constituting a second embodiment.

FIG. 5—It shows a raised side view, in ¼ section, of a pushbutton assembled on a control panel, with the insertion of the corresponding base piece of the invention.

FIG. 6—It shows a front view of an alignment of pushbuttons mounted on a control panel, with the corresponding assembly bases, of FIGS. 4 and 5, the latter remaining collaterally backed to each other.

DESCRIPTION OF THE PREFERRED EMBODIMENTS

Figure 1:
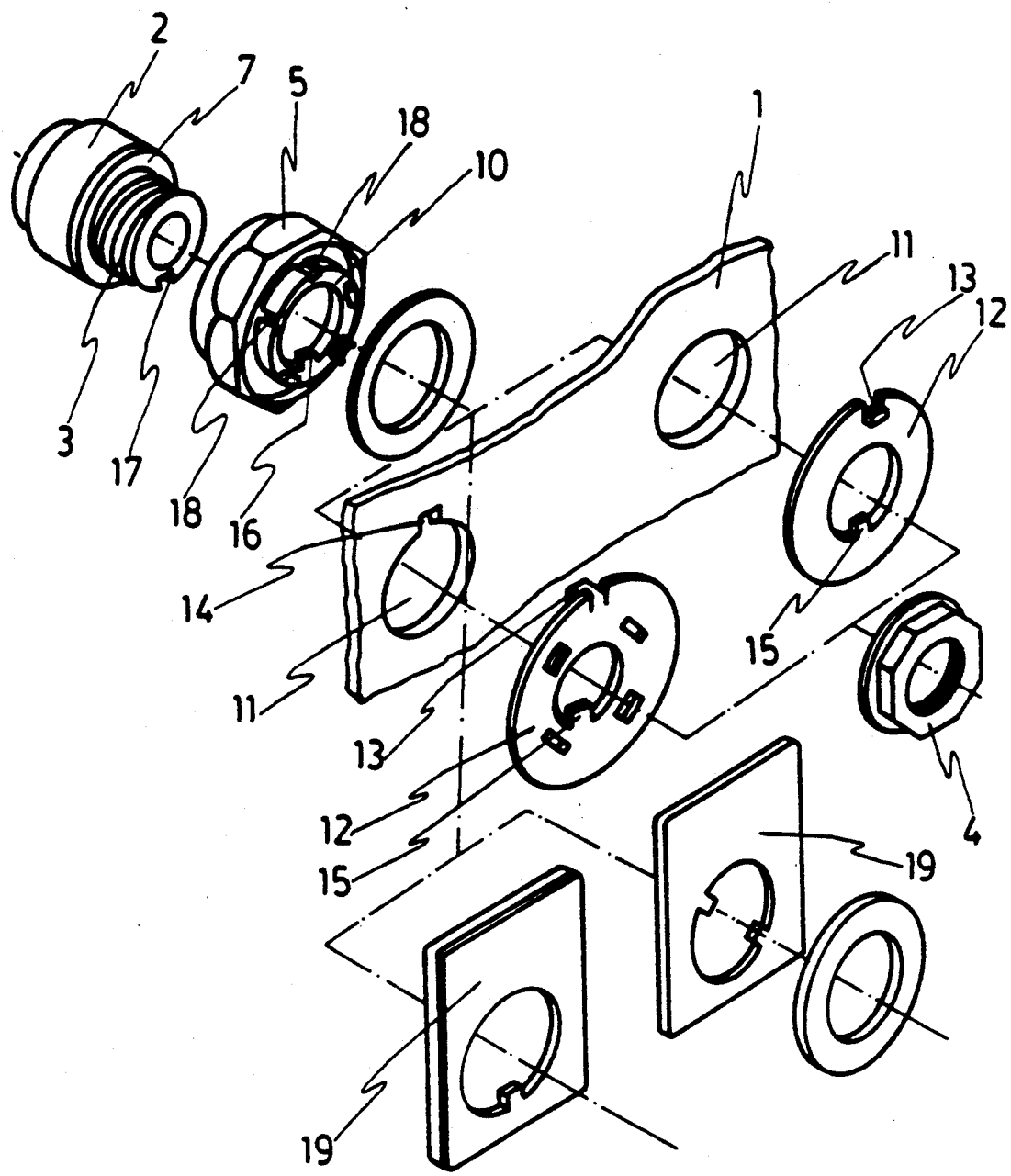
FIG. 1—It shows a perspective broken up view of the different elements and components, including the adapter of the invention, which intervene in the assembly of a pushbutton or similar element on a control panel, in a first example of embodiment, in order to permit the incorporation of a pushbutton in a holder with a diameter larger than the same.
Figure 2:
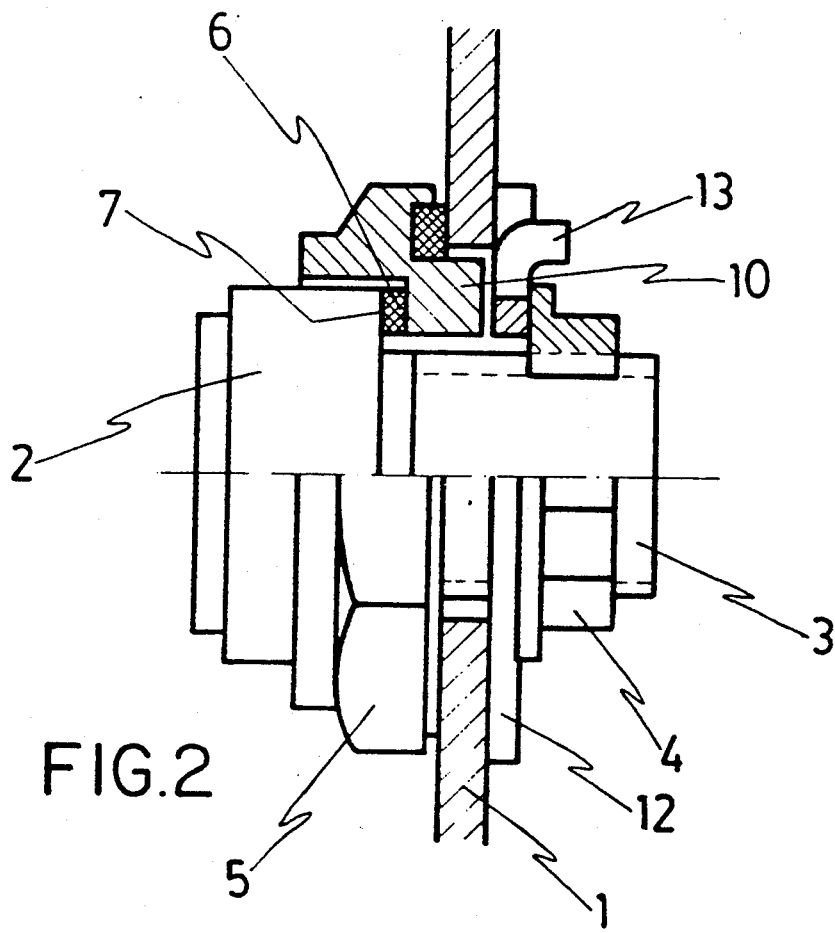
FIG. 2—It shows a raised side view, in ¼ section, of a pushbutton or similar element mounted on the adapter situated in a hole provided with a pushbutton of a larger format, according to the break-up of the above figure.
Figure 3:
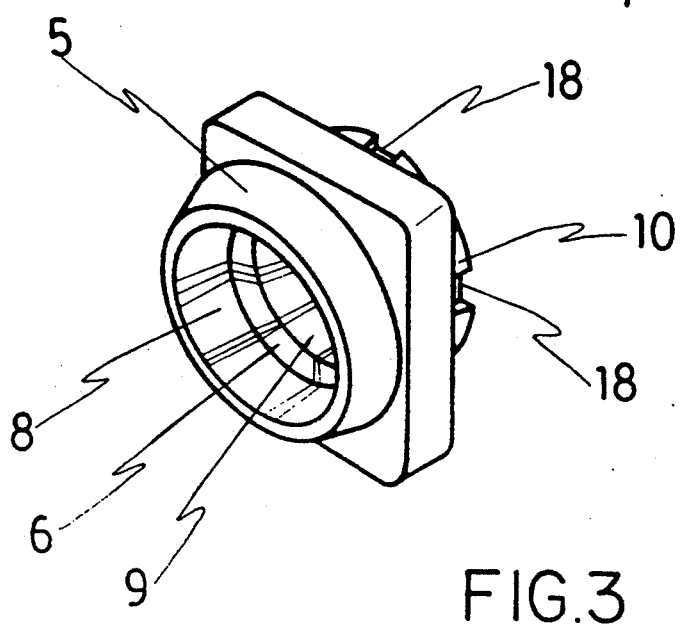
FIG. 3—It shows a perspective view of the adapter of the invention of FIGS. 1 and 2, constituting a first embodiment of the invention.

In view of the cited figures, it can be observed how in the first embodiment, and specifically referring to FIG. 1, it can be verified how in the first object of the invention, it is provided that for its use in a control panel (1) in order to carry out the assembly of the pushbutton, pilot or indicator, or any other similar element, said pushbutton or element being made up of a cylindric body (2) provided with a rear extension (3) having a thread for the fastening thereof, by means of a fastening nut (4) that remains situated at the surface opposite the assembly panel (1), with the particular feature that the threaded section (3) has a smaller diameter than section (2) of the cylindric body of the pushbutton.

On its part, the adapter itself, consists of a body (5) that may have any shape with regards to its contour, it being possible to be polygonal, cylindric, faceted, etc., and said cylindric body (5) is hollow and has inside a shoulder (6) which is dimensionally similar to the rear shoulder (7) provided between the cylindric body (2) and the rear extension (3) of the pushbutton itself, it being provided that sections (8) and (9) of a different diameter which result as a consequence of the inner front shoulder (6) determine the positioning means adjusted for sections (2) and (3) of a diameter different than the body of the pushbutton.

On the other hand, the adapter (5) or ring that constitutes it, is extended by its opposite end in a tubular portion (10) that is provided over the hole (11) of the control panel itself (1), in other words, the tubular portion (10) remains placed between the inner contour of its hole (11) and the inner contour of the section (3) belonging to the body (2) of the pushbutton.

Subsequently, in other words, upon the back of this tubular portion (10), there is a washer (12) upon which the fastening and tightening nut (4) presses, washer (12) which has a projection or front appendix (13) destined to establish its own positioning with regard to a notch (14) made in the hole (11) of the control panel (1), though this hole (11) may not have this notch (14), in which case the washer (12) would be situated in the opposite manner, in other words, with the appendix (13) directed towards the opposite part.

It has also been provided that this washer (12) includes in its inner contour an appendix (15) to position the ring (5), the latter having an appendix (16) which fits in a groove (17) provided in the extension or rear section (3) of the pushbutton itself (2).

It has also been provided that the tubular portion (10) of the ring (5) has outside some longitudinal grooves (18) destined to permit the inclusion of identifying labels (19) or any other type of element.

On the grounds of this idea and general structure of the adapter and other elements related to the same, it is possible to obtain assembly of a component of a smaller series or format in a housing of a larger series or format, sufficing for this purpose the insertion between the hole (11) of the control panel (1) and the threaded extension (3) of the pushbutton (2), the body (5) constituting the adapter, inside which the cylindric body (2) and the threaded extension itself (3) will adjust, while the tubular section (10) of the former will subsequently adapt to the hole (11) of the control panel (1.)

Likewise, the washer (12) is placed with its appendix (13) directed towards and fit in the notch (14) of the hole (11) of the control panel (1), in order to obtain the positioning of the whole unit. Now, then, when the hole (11) does not have said notch (14), said washer (12) is placed with its appendix facing outwards, providing the assembly thereof in any case.

In a second embodiment and specifically making reference to FIGS. 4, 5 and 6, the object of the invention is provided to assemble pushbuttons, pilots, etc. on the control panel (1) whose elements or pushbuttons are made up of the cylindric body (2), just like in the previous case, which by its end considered rear it continues in an extension (3) with a smaller diameter, provided with a thread for the fastening of the body (2) by means of a nut (4) that remains situated in the opposite surface of the control panel (1.)

Now, then, the assembly of the pushbutton or element (2) is done by means of a base (20) with a prismatic-rectangular and substantially flat shape, which has a circular opening or hole (21) whose diameter coincides with that of the body (2) of the pushbutton with the particular feature that in the bottom of said opening (21) there is an annular flange (22) whose inner diameter coincides with that of the rear extension (3) of the body (2) of the pushbutton.

Said annular flange (22) constitutes a positioning seat of the prismatic body (20) constituting the base with regard to the cylindric body (2), which establishes a unit that can be coupled to the control panel (1) by means of the fastening nut (4) which is conventionally threaded on the extension (3.)

On the other hand, it is provided that between the cylindric body (2) of the pushbutton and the front of the annular flange (22) of the prismatic body (20) there is a sealing washer (7) just like in the above example and as usual, while in the back of the annular flange (22) there is another sealing washer (23) so that the seat of the unit with regard to the front of the control panel (1) maintains its watertight condition.

Optionally and advantageously said sealing washer (23) is provided on one of its surfaces with a self-adhesive that is initially protected by a removable strip (27) in such a way that the self-adhesive surface is applied against the back of the annular flange (22) to facilitate assembly.

It has also been forseen that on the inner edge of the annular flange (22) there is a radial projection (24) that determines a positioning element with regard to a longitudinal groove that conventionally incorporates the rear extension (3) of the pushbutton, in such a way that the radial projection (24) constitutes the positioning means of the prismatic body (20) with regard to the pushbutton (2), which in turn is positioned with regard to the control panel (1), by means of a projection (25) provided for this purpose in the hole (11) made in the panel (1) and through whose hole (11) the threaded section (3) passes in order to receive the fastening of the fastening nut (4.)

Conventionally, the assembly of pushbuttons or similar units which has been alluded to, is done by removing the nut (4) and penetrating the rear extension (3) in the hole (11) of the control panel (1), just as it has been commented on above, after which the nut (4) is placed from the back. On its part, the assembly of the base (20) does the same operation, it sufficing only to insert between the back of the cylindric body (2) of the pushbutton and the front of the control panel (1) said prismatic body (20) which constitutes the base, with the adhered seal (23), when such a condition is required.

I claim:

1. Improved adapter for an electric component of the type to be coupled to a hole in a control panel, said component having a cylindric body with a threaded rear extension of smaller diameter, the adapter comprising: a ring provided inside with a front shoulder similar to a rear shoulder provided between the cylindric body and the rear extension of the component, said ring having two inner sections with diameters corresponding respectively to the diameter of the cylindric body and to the diameter of the rear extension of the component, said ring having a rear tubular portion that fits adjustably between the rear extension of the component and the hole of the control panel.

2. Improved adapter for an electric component according to claim 1, essentially characterized because between the back of the tubular portion of the ring and the fastening nut there is a washer provided with a front appendix for the positioning thereof with regard to a notch made in the hole of the control panel; there being another appendix in the inside of said washer for the positioning of the ring, which in turn has another appendix for the fitting thereof into a groove made in the rear extension of the component; with the particular feature that the washer is reversibly positionable in order for its front appendix to remain in the direction contrary to the back of the control panel, when its hole lacks the notch.

3. Improved adapter for an electric component according to claim 2, essentially characterized because the tubular portion of the ring is provided outside with a series of longitudinal grooves for the positioning of identifying labels or similar auxiliary elements.

4. Improved adapter for an electric component of the type to be coupled to a control panel having a hole, the component has a cylindric body with a rear extension of smaller diameter, threaded to receive a fastening nut, the adapter comprises a prismatic rectangular flat independent body with a circular opening of the same diameter as the body of the component, it being provided that in the button of said circular opening there is an annular flange with an inner diameter coinciding with that of the rear extension of the component, said annular flange constituting a positioning seat of the prismatic body with regard to the cylindric body of the component, establishing a unit that can be coupled to the control panel by means of the fastening nut conventionally threaded in the rear extension.

5. Improved adapter for an electric component according to claim 4, essentially characterized because the inner edge of the annular flange of the prismatic body has a radial projection that constitutes a positioner with regard to the longitudinal groove conventionally provided in the rear extension of the component, in order to constitute the positioning means of the prismatic body with regard to the component, which is positioned with regard to the control panel by means of a similar projection provided in the hole made in said control panel.

6. Improved adapter for an electric component according to claim 4, essentially characterized because between the cylindric body of the component and the front of the annular flange of the prismatic body there is a conventional sealing washer, while in the back of the annular flange there is a advantageously provided another sealing washer for seating the unit with regard to the front of the control panel.

7. Improved adapter for an electric component according to claim 6, essentially characterized because said another sealing washer is advantageously provided with a self-adhesive surface initially covered by a removable protector.

8. Improved adapter for an electric component according to claim 6, essentially characterized because the inner edge of the annular flange of the prismatic body has a radial projection that constitutes a positioner with regard to a longitudinal groove conventionally provided in the rear extension of the component, in order to constitute the positioning means of the prismatic body with regard to the component, the prismatic body being positioned with regard to the control panel by means of a similar projection provided in the hole made in said control panel.

9. Improved adapter for an electric component according to claim 8, essentially characterized because said another sealing washer is advantageously provided with a self-adhesive surface initially covered by a removable protector.

* * * * *